US006817318B1

(12) United States Patent
Kurt

(10) Patent No.: US 6,817,318 B1
(45) Date of Patent: Nov. 16, 2004

(54) AUTOMATIC HORSE TRAINING SYSTEM

(76) Inventor: Mehmet Kurt, Sarisakal Fabrikasi Sarisakal Ceyhan, 01960 Adana (TR)

( * ) Notice: Subject to any disclaimer, the term of this patent is extended or adjusted under 35 U.S.C. 154(b) by 0 days.

(21) Appl. No.: 10/312,112

(22) PCT Filed: Sep. 1, 2000

(86) PCT No.: PCT/TR00/00048

§ 371 (c)(1),
(2), (4) Date: May 6, 2003

(87) PCT Pub. No.: WO01/97606

PCT Pub. Date: Dec. 27, 2001

(51) Int. Cl.⁷ .............................................. A01K 15/00
(52) U.S. Cl. ...................................... 119/712; 119/703
(58) Field of Search .......................... 54/71; 472/86; 119/701, 703, 704, 712, 714

(56) References Cited

U.S. PATENT DOCUMENTS

| | | | |
|---|---|---|---|
| 3,543,724 A | * 12/1970 | Kirkpatrick et al. | ........ 119/702 |
| 4,130,091 A | * 12/1978 | Knudson | ..................... 119/701 |
| 4,266,508 A | * 5/1981 | McNulty | ..................... 119/703 |
| 4,619,222 A | 10/1986 | Sundberg | |

FOREIGN PATENT DOCUMENTS

DE    198 34 257    2/2000

* cited by examiner

Primary Examiner—Robert P. Swiatek
(74) Attorney, Agent, or Firm—Kenyon & Kenyon

(57) ABSTRACT

An automatic horse training system includes a horse training device with lateral and rear sides covered by a flexible material. The front side is closed by a locking arrangement thereof, and actuated by a tractor placed front or rear part thereof, and guided by rails or line located upper side of the training device. Electrodes or veterinarian arrangement are placed on different regions of the bodies of the horses for monitoring physical performances thereof by remote electronic signal transmission or alternatively by remote sensing. Movement of the whole mechanical components including stables and corridors in the training system is performed automatically.

25 Claims, 7 Drawing Sheets

AUTOMATIC HORSE TRAINING SYSTEM

This application is a 371 of PCT/TR00/00048 filed Sep. 1, 2000.

FIELD OF THE INVENTION

The present invention relates to an automatic horse training system providing training of horses for races without human intervention.

BACKGROUND INFORMATION

Other systems are highly dependent upon labor of human beings. Horse training programs are performed by horse trainers applying a formerly determined training practice.

Since horses are very sensitive creatures in terms of their psychological sense, and the horse training patterns are dependent upon human beings, the efficiency of such training models becomes inevitably dependent on the pedagogical formation of the horse trainers. However, experiences have dramatically shown that lacking of such trainers not having pedagogical formation and so the difficulties for acknowledging psychologies of horses result violence of the trainers against horses being trained. This is the main mistake causing the racehorses to stray away from the racecourses or even causing death of the horses.

Despite horses being very sensitive in terms of psychological sense, they however may be trained conditionally. In the light of this concept, horses begin training in the early years of their lives, i.e., in the period of colt. Consequently, showing great performances of racehorses are not only dependent on their origins but also dependent on the features gained later than birth.

In order to provide that the racehorses run the particular distances in a fastest manner, training programs, given thereof, should be started during the colt period of the horse's life.

However the main obstacle in determining whether a horse is fit to start the said training program is the physical ability of the horse to carry the rider during training Due to this obstacle, the common practice is to wait for the colt to improve physically for training purpose according to present approach. Consequently, this particular period of time is idle in terms of valuable training time and in addition to that potential racehorses start their race orientation late, accompanying with losing their potential efficiency.

When the number of horses being trained throughout the world is considered, the training pattern dependent on human intervention may possibly hamper the training program scheduled earlier. This results in a decrease in racehorse potentials.

On the other hand, physical factors of horses are of crucial importance in terms of performances thereof during a race. Said physical factors basically include heart and lung functions and muscles. Determination of physical capabilities of racehorses is normally performed after the race, i.e., when the horse is not at its top performance level. Naturally, such kind of physical activity determination do not reflect the actual values that are important for a racehorse performance.

SUMMARY OF THE INVENTION

It is an object of the present invention to provide a complete automation in the process of horse training course.

Another object of the present invention is to eliminate the trainers lacking pedagogical formation and human intervention for horse training so that psychological stabilization of horses may be achieved.

Another object of the present invention is to preclude disabling and so being away from racecourses of the racehorses.

Another object of the present invention is to monitor and evaluate the performances of the racehorses during the training by locating electrodes and veterinarian arrangements to different regions of the bodies of horses.

The automatic horse training system according to the present invention includes four main components. Stables, being one of the components, are arranged next to each other and occupy space that only one horse may exist therein. The second main component is horse training device rear and lateral sides covered by a flexible material thereof. The third main component is an electronic signal supplier for controlling the other system components such as horse training device stable doors etc. The fourth main component is a reflector unit for reflecting signals supplied by the electronic supplier unit.

In addition to the said main components, there is also a monitoring arrangement placed out of the racecourse for monitoring physical performances of the racehorses by electrodes and veterinarian arrangements located on different regions of the bodies of horses.

In the stables occupying only one horse there are guiding arrangements, for example pistons, actuated by control unit and moving through the width of the stable. In order to introduce the horses in the horse training device, there is a corridor between the stable and the horse training device. Another guiding arrangement leading from inside the guiding arrangement, moving through the width of the stable, forces the horse into the horse training device through the corridor.

Before starting the training program, rear doors of the horse training devices are aligned with the corridor door that the horse leaves through. Therefore the racehorse is introduced into the horse training device, the rear and lateral sides of which are covered by a flexible material thereof. Similarly, the front side of the horse training device is kept close by a locking arrangement thereof. This locking arrangement functions to maintain the horse in the horse training device and during the training program, but has a feature that it may be unlocked when the horse starts sprinting.

When the training program is completed, front doors of the horse training devices are aligned with the corridor door so that the horse may introduce into the corridor and to the stable finally. At this stage, the horse is forced to front door of the horse training device by a pushing arrangement located rear side of the horse training device so that the horse may leave the device and enter the corridor first and then the stable.

Another object of the present invention is to provide a multiple automatic components that enable the training of several horses simultaneously.

DETAILED DESCRIPTION

Figure 1:
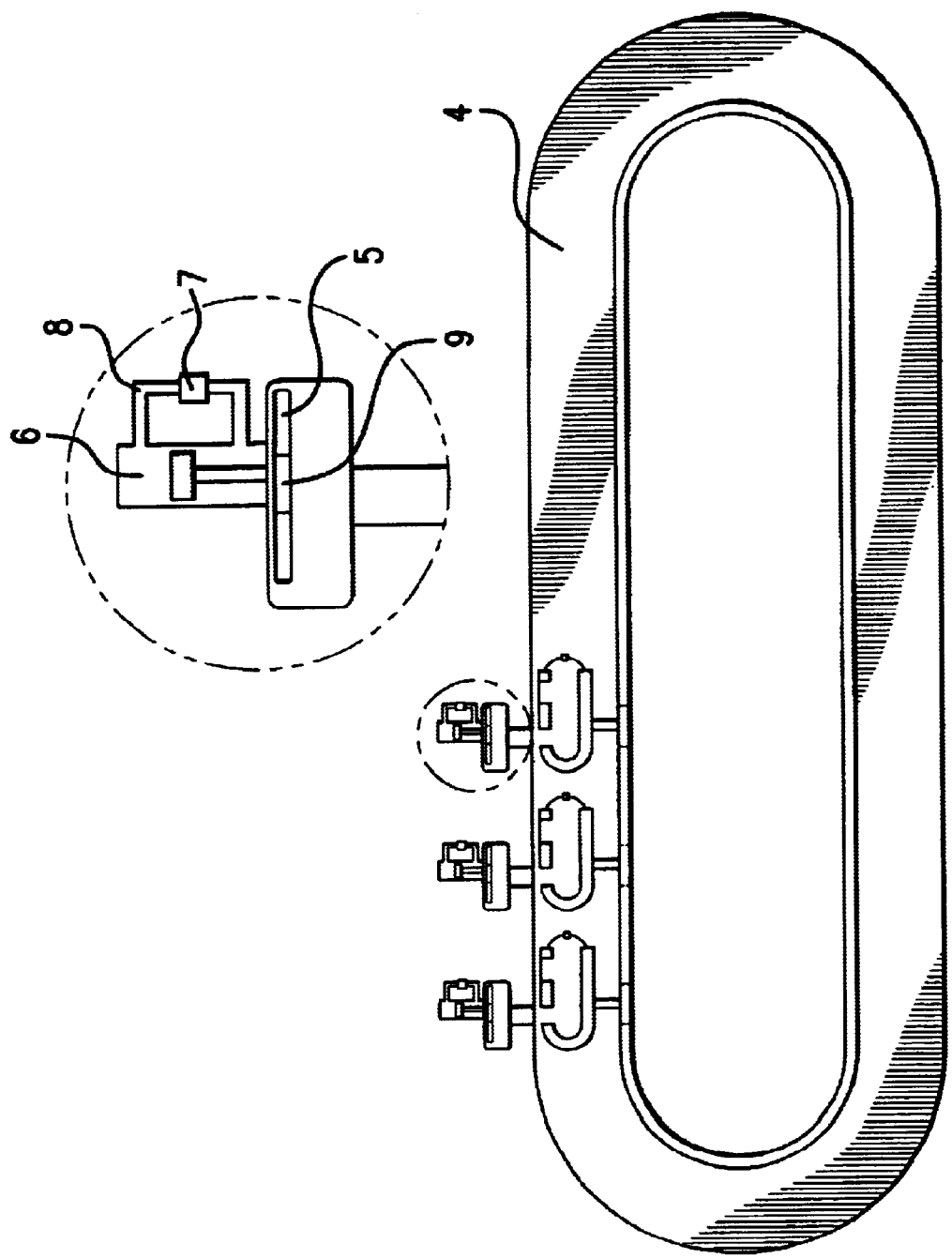
FIG. 1 illustrates the top view of the automatic horse training course with the accompanied training arrangement.

FIG. 1 illustrates the main components of the multiple horse training racecourse 4. Before starting training, stable door 17 is closed and displacements of horse guiding arrangement 5,9 which are one within the other are zero.

Control of the mechanical components included in the racecourse 4 is performed by automatically controlled equipment, i.e., by microprocessors. In this example the distance between the horse training devices 1 is constant.

In order to start the training program, rear doors 11 of the horse training devices 1 are aligned with the corridor doors 10. Distance between the corridor door 10 and rear door 11 is sufficiently short so that the horse that will be trained may not escape anywhere but be introduced into the horse training device 1. At this stage stable door 17 and the corridor door 10 are automatically opened and by actuating a pump 7, lubrication is passed through the cylinder pipes 8 to actuate the cylinder 6 so the first and the second horse guiding arrangement 5,9 are moved at the same time. Since the first guiding arrangement 5 has the same size as the stable 3 width, when it is actuated the horse inside the stable 3 is directed towards the corridor 2. Once the first horse guiding arrangement 5 reaches the level of stable door 17 its movement is terminated by a cylinder sensor 19 located in the stable 3. In this case the second guiding arrangement 9 is moved through the corridor 2 so as to direct the horse towards the corridor door 10. Afterwards, the horse goes through the corridor door 10 first, and then the rear door 11, which are both automatically opened, of the horse training device 1. After that the horse is introduced into the horse training device 1 and the rear door 11 is closed. Once the horse leaves the corridor 2, the horse guiding arrangement 5,9 are returned back their initial positions.

On the condition that a horse not able to leave the stable, running of the pump is terminated by manner of stable sensors 18 located inside the stable 3.

Lateral and rear sides of the horse training devices 1 are covered by a flexible material 201 in order to prevent the horse from hurting itself during the training program. The front side not covered by the said flexible material, is closed by a locking arrangement, however the locking arrangement also includes a flexible material.

Figure 2:
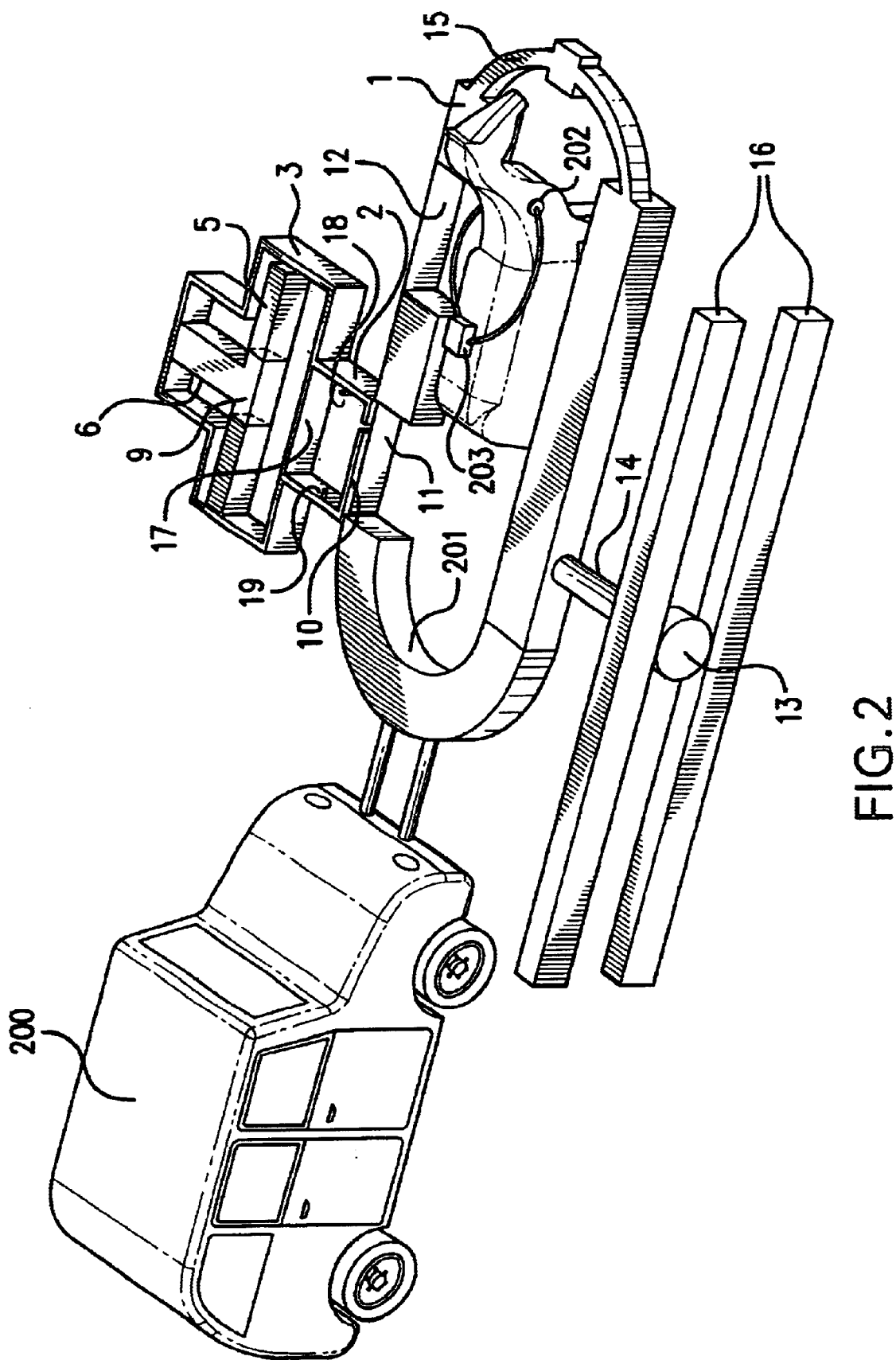
FIG. 2 illustrates the horse training device with the accompanied components such as stable, corridor and guiding elements.

As shown in FIG. 2, one end of a shaft 14 (a connecting rod) is mounted to a side of the training device 1, and the other end of the shaft 14 is provided with a wheel 13, which engages rails 16 extending along the track. Once the horse training device 1 is actuated, e.g., by a tractor 200 that pushes the training device 1, the wheel 13 moves along the rails 16, and the training of the horse in the training device 1 may be maintained at a desired speed.

Actuation of the horse training device 1 may be achieved in several manners: According to one exemplary embodiment, tractor 200 located rear or front of the training device 1 is used to move the horse training device.

Figure 3:
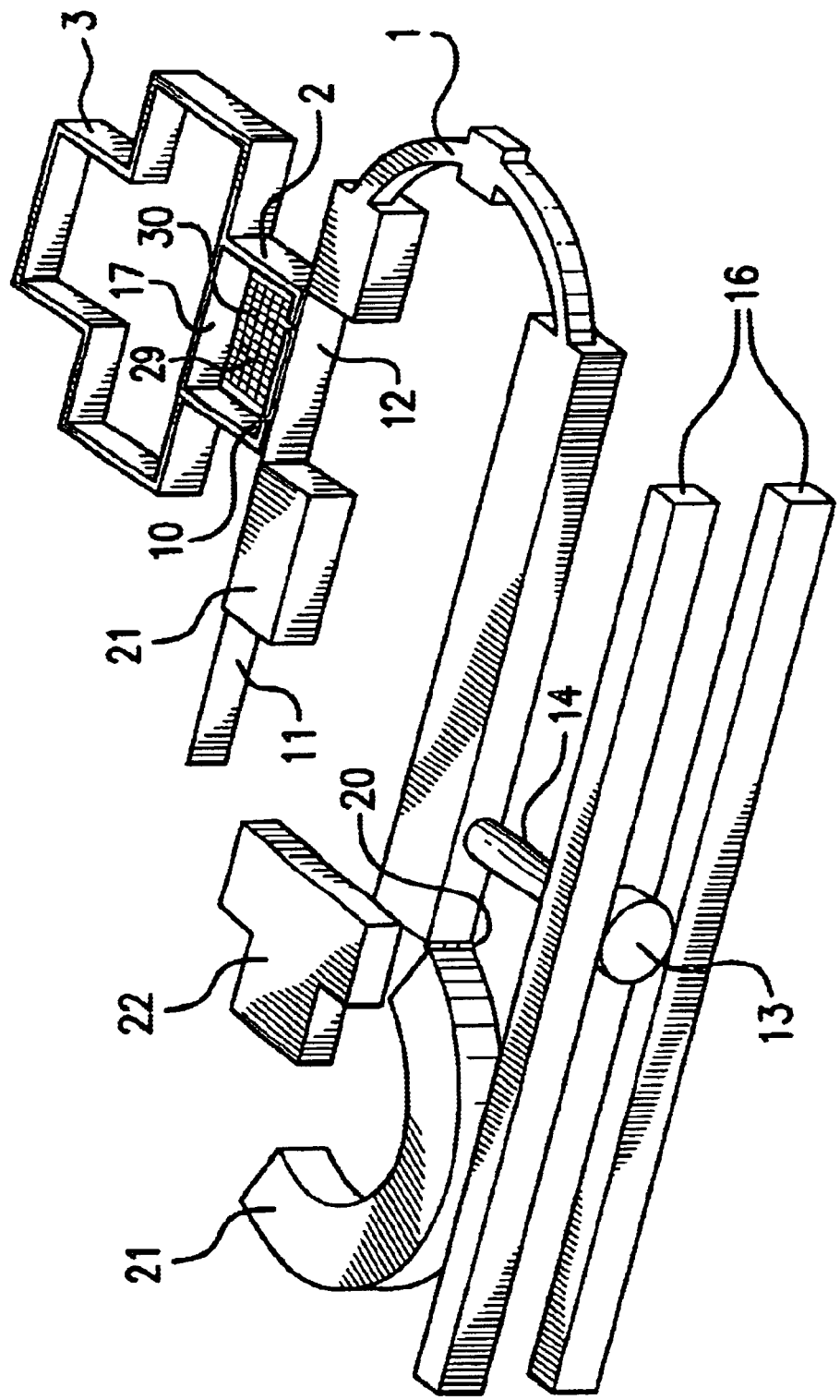
FIG. 3 illustrates the manner of introduction of horses into the stables.

After the training program is completed, as similar to the starting of the program, front doors 12 of the training devices are aligned with the corridor doors 10 in order to direct the horse towards the stable 3. At this stage front door 12 of the training device 1 is opened first and then the rear side having a semi-circular shape is opened from its hinge 20 by separating the rear side contacted with interface surface 21 from the lateral sides of the device 1. Afterwards pushing arrangement 22 introduced to the training device 1 through the opened rear side, forces the horse to leave the training device 1 from the front door 12. Once the horse leaves the device 1, it goes through the corridor 2 and enter the stable 3 as seen in FIG. 3. Since the racing shoes get dirty during the training program, the legs and the racing shoes of the horses are cleaned by brushes 30 located under a grid 29 while they go through the corridor 2. Although FIG. 3 illustrates the same embodiment of the present invention illustrated in FIG. 2, the tractor 200, the horse (with the attached electrode 202 and the veterinarian measuring arrangement 203), and the guiding arrangements 5 and 9 in the stable 3 have been omitted from FIG. 3 in order to avoid unnecessary complications in the drawings.

Alternatively the pushing arrangement 22 providing guidance of the horses to the corridor 2 may be configured behind the training device 1.

Figure 4:
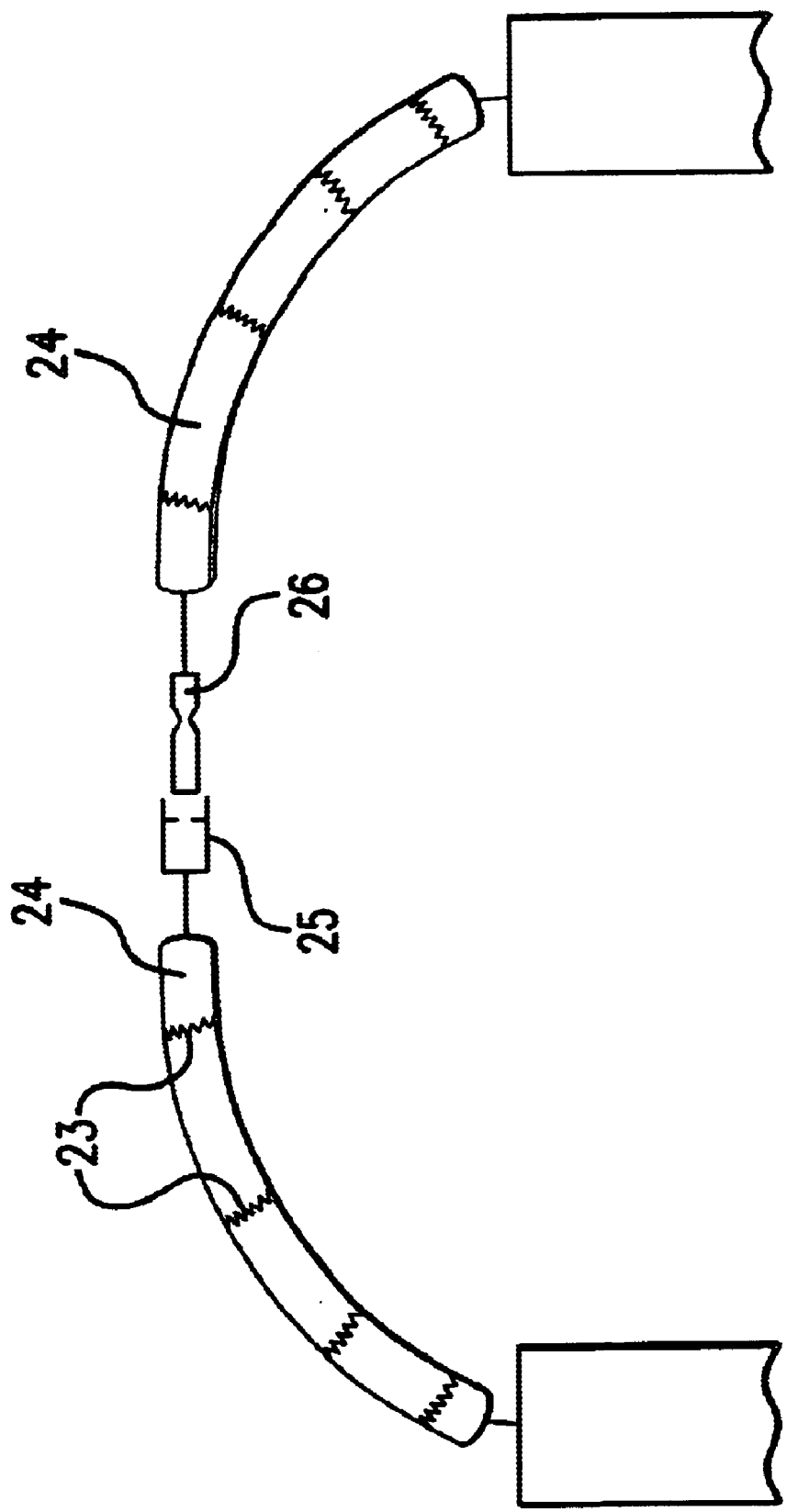
FIG. 4 illustrates the locking arrangement in detail.

In FIG. 4, detailed view of the locking arrangement 15 is provided. According to the figure, locking arrangement consists of flexible arms 24 connected by its ends to the training device 1 and a female part 24 and male part 26 that link the said flexible arms 24. There exists springs 23 so as to decrease the stiffness of the flexible arms. Since the speed of the training devices 1 are maintained constant at predetermined level, when a horse starts sprinting the locking arrangement 15 may unlock itself so that the horse may leave the training device 1 without an obstacle.

Figure 5:
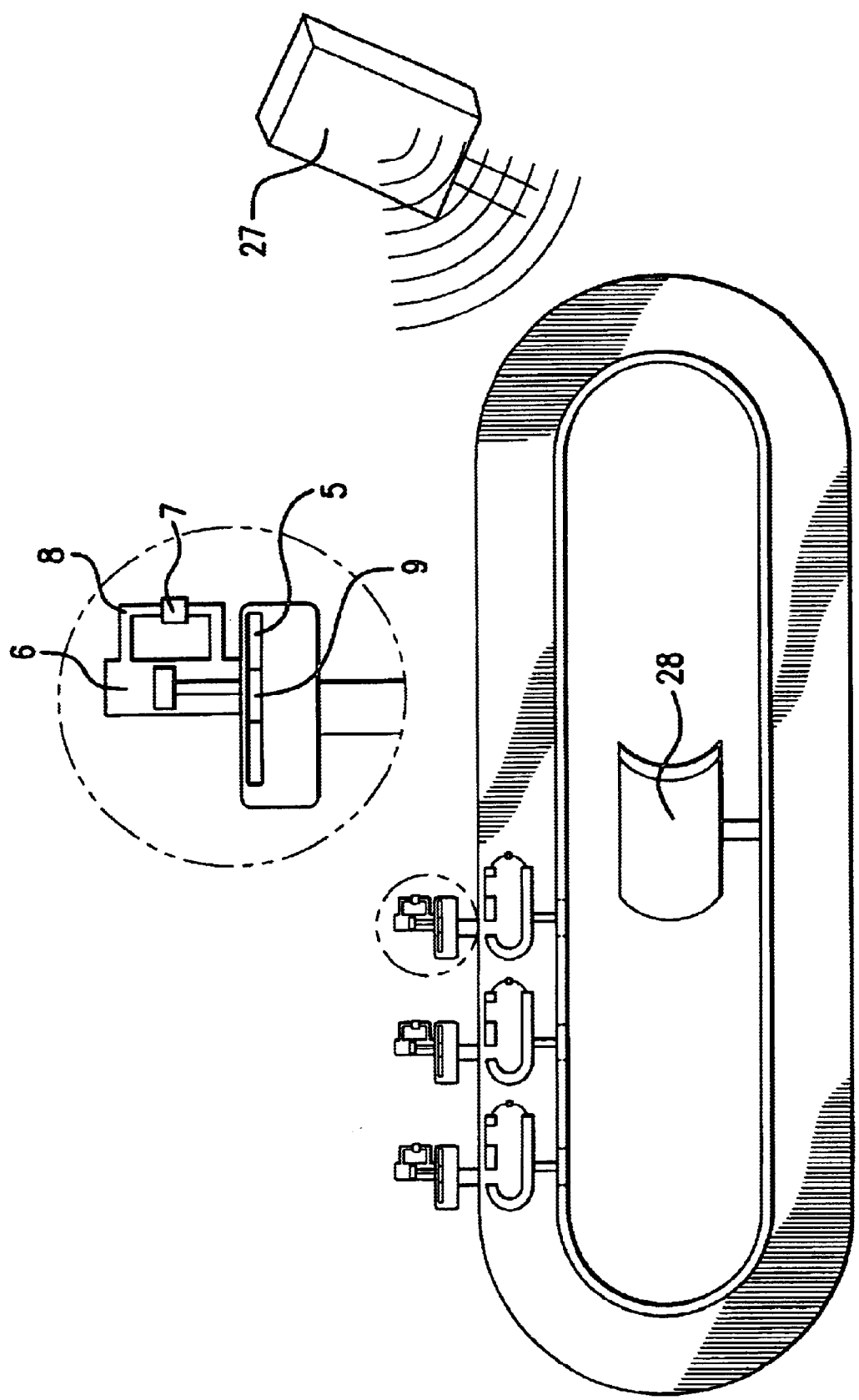
FIG. 5 illustrates an alternative control arrangement including an electronic signal supplier and a reflector for the control of automatic components.

Mechanical components in the scope of the present invention may be controlled alternatively by an electronic signal supplier 27 and a reflector 28 unit that receives such electronic signals and reflects thereof to the mechanical components. Said alternative exemplary embodiment is illustrated in FIG. 5.

Figure 6:
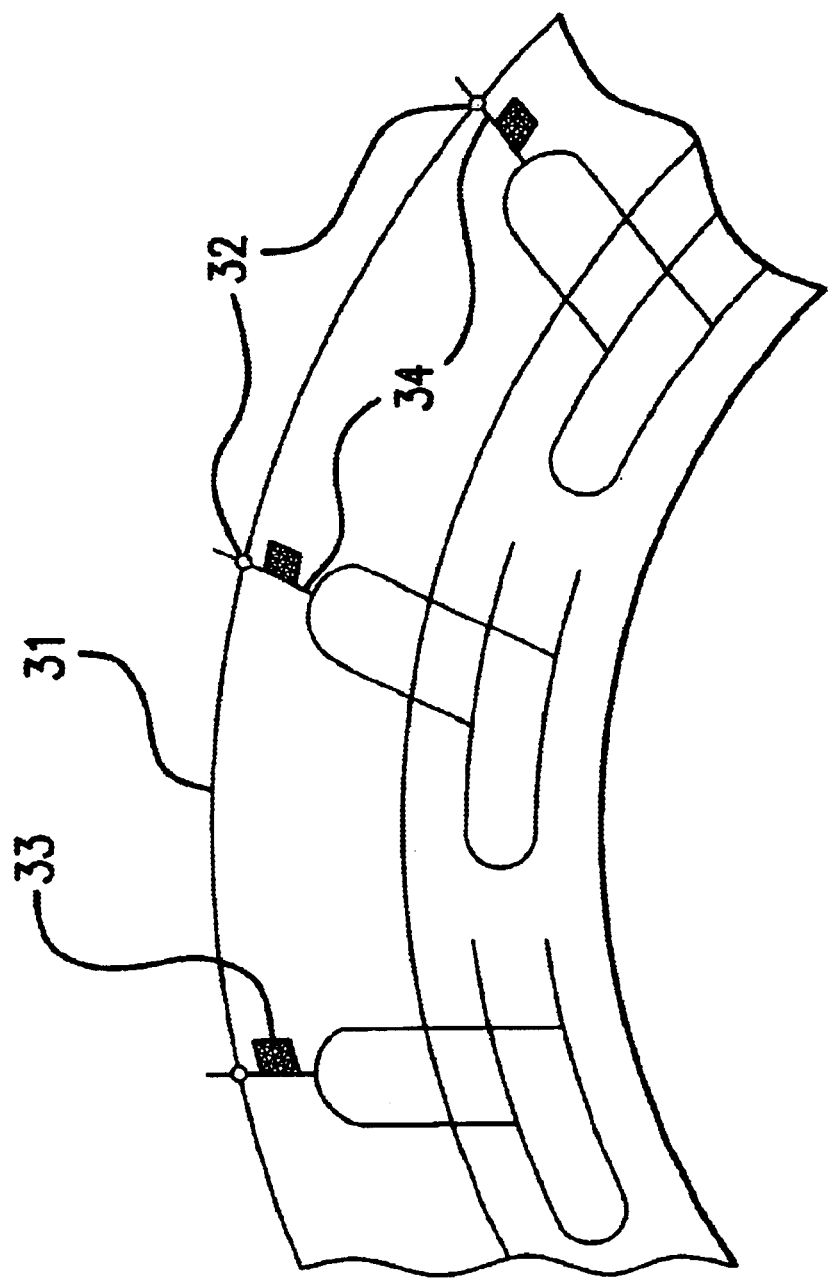
FIG. 6 illustrates an alternative line configuration of the horse training device according to another exemplary embodiment of the present invention.

Similarly another alternative exemplary embodiment may be suggested for the rail structure that provides the training devices 1 aligned and guided around the racecourse. In this alternative exemplary embodiment, training devices 1 are guided by manner of a line 31 constructed above the devices 1 that are connected thereto. This kind of alternative exemplary embodiment is shown in FIG. 6. According to the figure, the training devices 1 are displaced vertically through the device columns 34, i.e., upwards and downwards directions by manner of motors 33 located at the line connection points 32. In this structure there is no rear and front doors of the training devices 1, the movement of which occur in vertical direction. Similarly in this alternative training device, there is a locking arrangement 15 located at rear side of the device 1 for closing thereof.

Above-mentioned racecourse 4, including training devices 1, stables 3 etc. that may be single or multiple components, may be configured as several racecourses that are within one another. This exemplary embodiment is illustrated in FIG. 7.

One of the racecourses is provided for training program that serves a constant speed for the horses and the other one is for sprinting of the horses and the third one is just for walking of horses.

Figure 7:
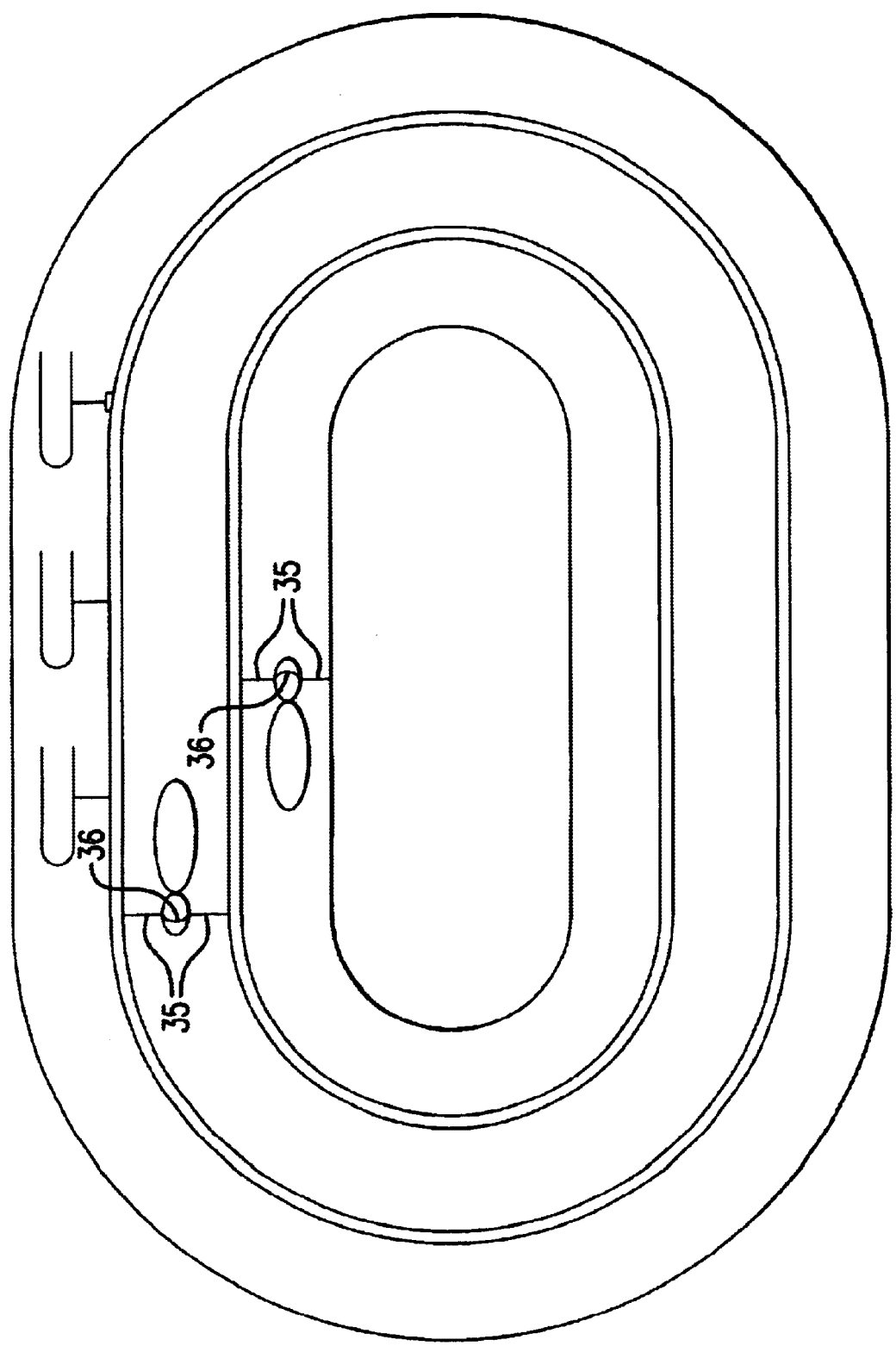
FIG. 7 illustrates the racecourses one within the other.

Said multiple racecourse, particularly the parts for sprinting and walking of the horses are configured with some differences with respect to the constant speed configuration in that the horse sprinting or walking is put on a bridle 36 and said bridle is connected to rails 16 as seen in FIG. 7 by manner of cords 35 the ends of which are disposed into the rails 16 via wheels 13.

On the other hand, in order to determine the physical performances during the training program, several electrodes 202 and veterinarian arrangements 203 that may be controlled remotely by electronic signal transmission or alternatively by remote sensing are placed at different regions of the bodies of the horses. Therefore monitoring of the heart, lung and muscles during the training program occurs. In addition to that instantaneous performance determining methods, it is possible to evaluate physical performances of the horses by samples taken from the spittle and blood of the horses.

What is claimed is:

1. An automated horse training system, including:
   at least one stable with an associated corridor;
   a locking arrangement;
   at least one horse training device, lateral sides and a rear side of the at least one horse training device being covered by a flexible material and a front side of the at least one horse training device being closed by the locking arrangement;
   a tractor actuating the at least one horse training device, the tractor being arranged at one of the front side and the rear side of the at least one horse training device;
   one of a plurality of rails and a line arranged on a side of the at least one horse training device for guiding the tractor; and
   one of an electrode and a veterinarian measurement arrangement arranged on a body of a horse for monitoring a physical performance of the horse by one of remote electronic signal transmission and remote sensing;
   wherein mechanical movements of components of the horse training system are performed automatically.

2. The automated horse training system of claim 1, wherein the at least one stable includes a first horse guiding arrangement configured to move therein, and the corridor includes a second horse guiding arrangement configured to move therein, and wherein a plurality of horse training devices are provided.

3. The automated horse training system of claim 2, wherein a pump actuates the first horse guiding arrangement and the second horse guiding arrangement, and wherein a cylinder allows movement of the first horse guiding arrangement and the second horse guiding arrangement.

4. The automated horse training system of claim 3, wherein the at least one stable includes a stable sensor and a stable door, and wherein the cylinder includes a cylinder sensor, the stable sensor and the cylinder sensor terminating a motion of the first horse guiding arrangement at a level of a stable door.

5. The automated horse training system of claim 1, wherein the at least one stable includes at least one stable door, the corridor includes at least one corridor door, and the at least one horse training device includes at least one device front door and at least one device rear door.

6. The automated horse training system of claim 1, wherein the at least one horse training device includes a shaft, a wheel arranged at an end of the shaft, and a plurality of rails, wherein the wheel is coupled to the rails.

7. The automated horse training system of claim 1, wherein the locking arrangement is arranged at the front side of the at least one horse training device.

8. The automated horse training system of claim 7, wherein the locking arrangement includes a plurality of flexible arms, a female part and a male part connecting the plurality of flexible arms to each other, and wherein a plurality of springs are arranged in the plurality of flexible arms.

9. The automated horse training system of claim 1, wherein the rear side of the at least one horse training device includes a hinge for opening the rear side.

10. The automated horse training system of claim 1, wherein a plurality of mechanical components of the automatic horse training system are actuated by automatically controlled equipment.

11. The automated horse training system of claim 10, wherein mechanical movements of components of the horse training system are actuated by an electronic signal supplier and a reflector unit receiving a plurality of electronic signals to control the plurality of mechanical components.

12. The automated horse training system of claim 1, further comprising:
   a plurality of brushes for cleaning race shoes and legs of a horse after completion of a training program.

13. The automated horse training system of claim 1, wherein the line is arranged around a racecourse and a plurality of line connection points for moving the at least one horse training device are arranged in vertical direction.

14. The automated horse training system of claim 1, further comprising:
   a racecourse including at least one of a sprinting racecourse, a walking racecourse, and a racecourse for constant speed training.

15. The automated horse training system of claim 14, further comprising:
   a plurality of cords for connecting a bridle of a horse to the plurality of rails, and a plurality of wheels arranged at an end of the plurality of cords in at least one of the sprinting racecourse and the walking racecourse.

16. A method for operating an automated horse training system, comprising:
   directing a horse into at least one horse training device by using a mechanical horse guiding arrangement;
   moving the at least one horse training device around a racecourse as part of a training program, wherein the at least one horse training device is moved by a tractor, and wherein the at least one horse training device is guided along one of a plurality of rails and a line arranged on a side of the at least one horse training device;
   using one of an electrode and a veterinarian arrangement for monitoring a physical performance of the horse during the training program;
   completing a movement of the at least one horse training device and finishing the training program; and
   removing the horse from the at least one training device by using a mechanical pushing arrangement.

17. The method of claim 16, further comprising:
   aligning a rear door of the at least one horse training device with a corridor door of a corridor before the training program is started, wherein the monitoring of the physical performance is achieved by one of remote electrical signal transmission and remote sensing.

18. The method of claim 17, further comprising:
   opening a stable door after aligning the rear door of the at least one horse training device with the corridor door; and opening the corridor door after opening the stable door.

19. The method of claim 18, further comprising:

displacing a first guiding arrangement in a stable, after opening the corridor door, and once the first guiding arrangement reaches the stable door, the first guiding arrangement is returned to an initial position.

20. The method of claim 16, further comprising:

introducing the horse into a stable, through a corridor; and closing a door of the stable;

wherein the monitoring of the physical performance is achieved by one of remote electrical signal transmission and remote sensing.

21. A method for operating an automated horse training system, comprising:

directing a horse into at least one horse training device by using a horse guiding arrangement, wherein the directing step includes:

aligning a rear door of the at least one horse training device with a corridor door of a corridor before the training program is started;

opening a stable door after aligning the rear door of the at least one horse training device with the corridor door;

opening the corridor door after opening the stable door;

displacing a first guiding arrangement in a stable, after opening the corridor door, and once the first guiding arrangement reaches the stable door, the first guiding arrangement is returned to an initial position; and moving a second guiding arrangement through the corridor and opening the rear door after the first guiding arrangement reaches the stable door;

moving the at least one horse training device around a racecourse as part of a training program;

using one of an electrode and a veterinarian arrangement for monitoring a physical performance of the horse during the training program;

completing a movement of the at least one horse training device and finishing the training program; and removing the horse from the at least one training device by using a pushing arrangement.

22. The method of claim 21, wherein the directing step further includes:

introducing the horse, after opening the rear door, into the at least one horse training device; and closing the rear door after introducing the horse.

23. The method of claim 22, further comprising:

moving the at least one horse training device, after closing the rear door; and aligning the front door of the at least one horse training devices with the corridor door and opening the front door once the training program is completed.

24. The method of claim 23, further comprising:

opening, after opening the front door once the training program is completed, the rear door of the at least one horse training device; and displacing the pushing arrangement to force the horse to leave the at least one horse training device.

25. The method of claim 24, further comprising:

cleaning race shoes and legs of the horse, after the horse leaves the at least one horse training device.

* * * * *